United States Patent
Pakianathan (10) Patent No.: US 9,651,923 B2
(45) Date of Patent: May 16, 2017

(54) BUMP-LESS TRANSFER TERM FOR PROPORTIONAL ACTION CONTROLLERS THAT ESCHEW THE INTEGRAL ACTION TERM

(71) Applicant: Manuel Jesubatham Pakianathan, Singapore (SG)

(72) Inventor: Manuel Jesubatham Pakianathan, Singapore (SG)

(*) Notice: Subject to any disclaimer, the term of this patent is extended or adjusted under 35 U.S.C. 154(b) by 59 days.

(21) Appl. No.: 14/316,807

(22) Filed: Jun. 27, 2014

(65) Prior Publication Data

US 2015/0134084 A1 May 14, 2015

(51) Int. Cl.
*G06F 19/00* (2011.01)
*G05B 11/38* (2006.01)

(52) U.S. Cl.
CPC .................... *G05B 11/38* (2013.01)

(58) Field of Classification Search
USPC .................... 700/45, 29, 20, 108, 292, 8, 44
See application file for complete search history.

(56) References Cited

U.S. PATENT DOCUMENTS

| | | | | |
|---|---|---|---|---|
| 4,035,620 A | * | 7/1977 | Hobbs | G05B 7/02 318/591 |
| 4,036,011 A | * | 7/1977 | Gupta | F01K 9/023 137/599.07 |
| 5,504,672 A | * | 4/1996 | Hardiman | G05B 11/42 700/44 |
| 5,867,384 A | * | 2/1999 | Drees | G05B 5/01 700/42 |
| 6,122,605 A | * | 9/2000 | Drees | G05B 5/01 327/311 |

FOREIGN PATENT DOCUMENTS

WO     2004012017     * 2/2004

OTHER PUBLICATIONS

Hagglund, Supervision of adaptive control algorithms, 2000, Lund Institute of Technology, p. 1171-1180.*
Gareli et al., A bumpless method for multivariable process controllers viasliding mode, Jun. 5-7, 2006, International Workshop on Variable Structure Systems , Alghero, Italy, p. 121-126.*

* cited by examiner

*Primary Examiner* — Kidest Bahta

(57) ABSTRACT

In automatic process-control systems, the integral action term in Proportional plus Integral action (P+I) control is used primarily to prevent any continued deviations from a set-point, and concomitantly to secure a bump-less transfer from manual control to automatic control. However, there are serious set-backs when using the integral action term for level controls, due to the liability of the integral action term to cause overflows from vessels, which can result in disastrous oil-spills, when a process is on automatic control. Hence, to secure a bump-less transfer without the integral action term, an alternate method is necessary. The method advocated calls for an additional term, which has been termed as a Bump-less Transfer 'BT(t)' term, to be included into the control algorithm. This term accepts deviations from the set-point, and even brings about sufficient deviation from the set-point to secure a bump-less transfer, since deviations within the proportional band are normally acceptable for level controls.

3 Claims, 4 Drawing Sheets

GRAPH A Shows a direct acting controller with gain = 1 (100% PB) and B=50%.
GRAPH B Shows a reverse acting controller with gain=1(100%PB) when B=50%.
GRAPH C Shows a lopsided direct acting controller with gain=1 when B=75%.
GRAPH D Shows a lopsided direct acting controller with gain=1 when B=25%.
GRAPH E Shows a direct acting controller with gain =2 (50%PB) when B=50%.
Note: Lopsided controls will lead to control valves not opening or closing fully.

GRAPH A Shows a direct acting controller with gain = 1 (100% PB) and B=50%.

GRAPH B Shows a reverse acting controller with gain=1(100%PB) when B=50%.

GRAPH C Shows a lopsided direct acting controller with gain=1 when B=75%.

GRAPH D Shows a lopsided direct acting controller with gain=1 when B=25%.

GRAPH E Shows a direct acting controller with gain =2 (50%PB) when B=50%.

Note: Lopsided controls will lead to control valves not opening or closing fully.

FIG. 1

LEVEL JUST BEFORE BUMP-LESS TRANSFER TO AUTOMATIC CONTROL WITH THE MAGNITUDE OF BT(t) AUTOMATICALLY SET SO THAT BT(t) + B IS EQUAL TO THE MANUAL OUTPUT TO THE CONTROL VALVE BEFORE THE TRANSFER.

FIG. 2

LEVEL CONTROL AFTER THE BUMP-LESS TRANSFER TERM BT(t) IS REDUCED TO ZERO AFTER A SHORT DURATION THAT DEPENDS ON THE BLEED RATE OF BT(t), WHICH IS COMPENSATED BY THE LEVEL RISING TO 75%, DUE TO THE VALVE CLOSING SLIGHTLY MORE DURING THAT PERIOD, THEREBY BRINGING ABOUT SUFFICIENT DEVIATION FROM THE SET-POINT TO SECURE A BUMP-LESS TRANSFER.

FIG. 3

Figure 2:
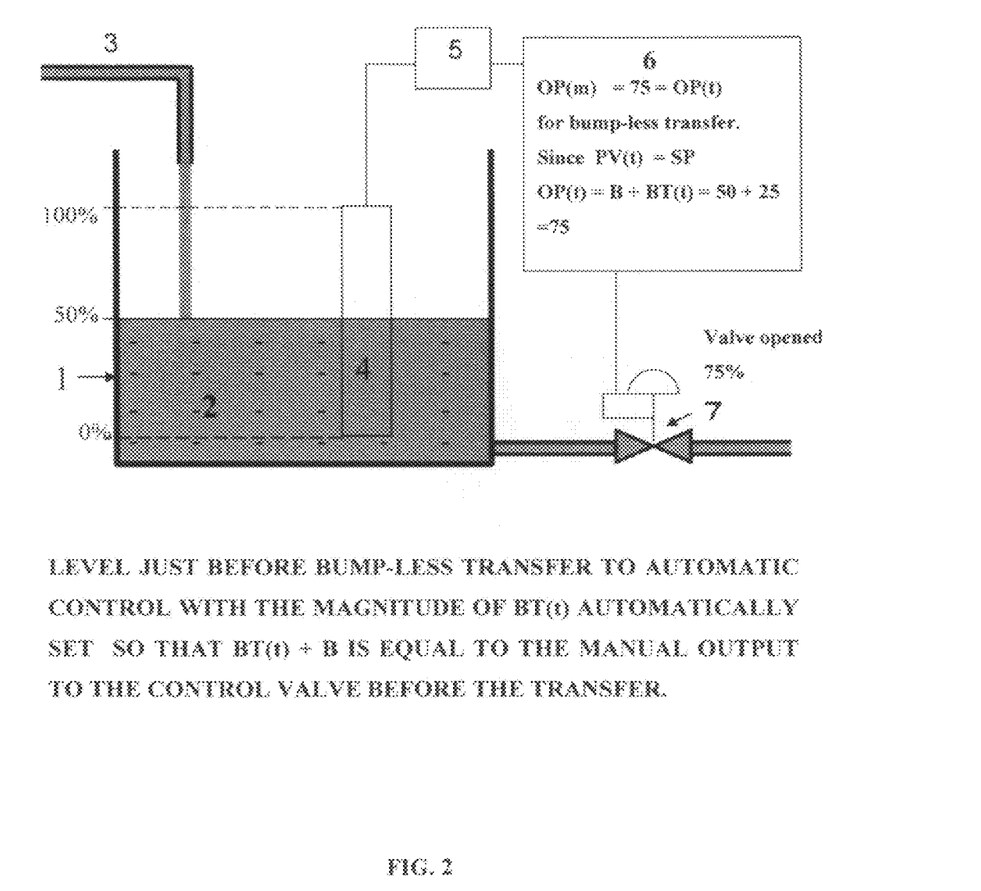
FIG. 2 is an illustration of level just before bump-less transfer to Automatic control with the magnitude of BT(t) automatically set, so that BT(t)+b is equal to the manual output to the control valve before the transfer when employing this novel term.
Figure 3:
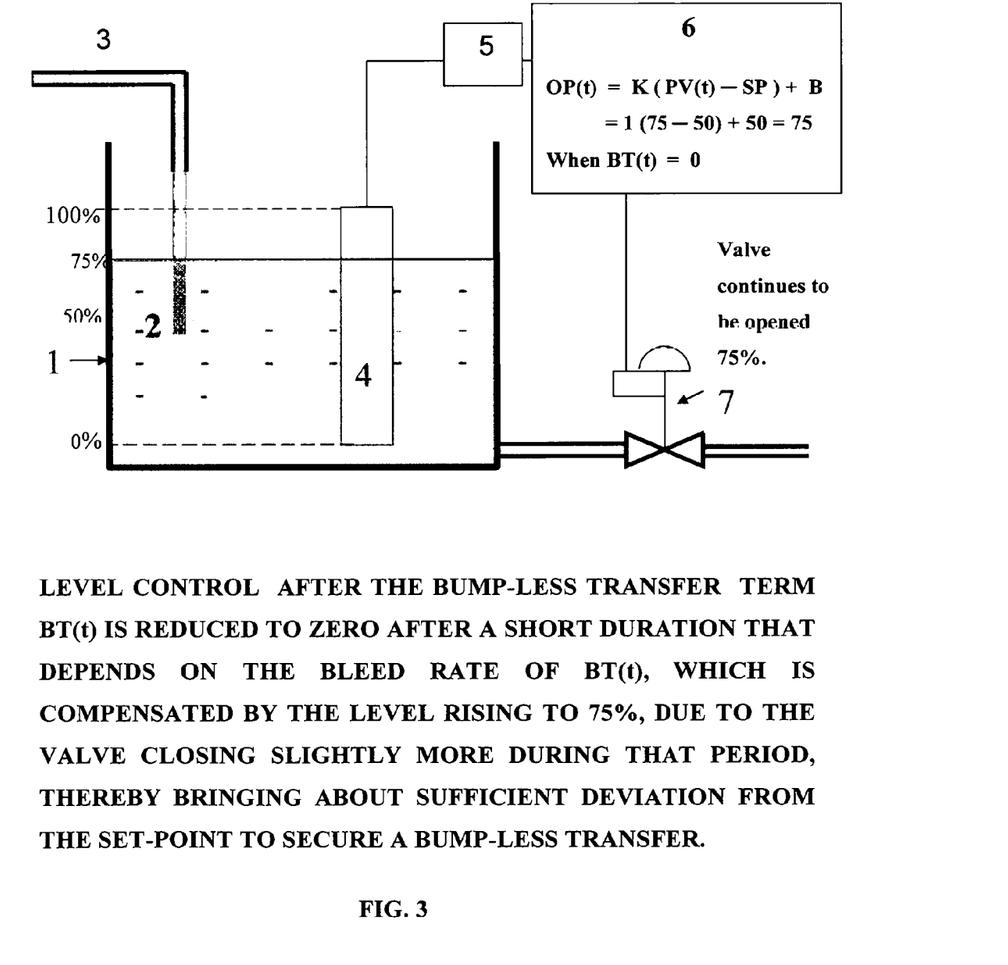
FIG. 3 is an illustration of level control after the bump-less transfer term BT(t) is reduced to zero after a short duration that depends on the bleed rate of BT(t), which is offset by the level rising to 75%, due to the valve closing a bit more during that period.
Figure 4:
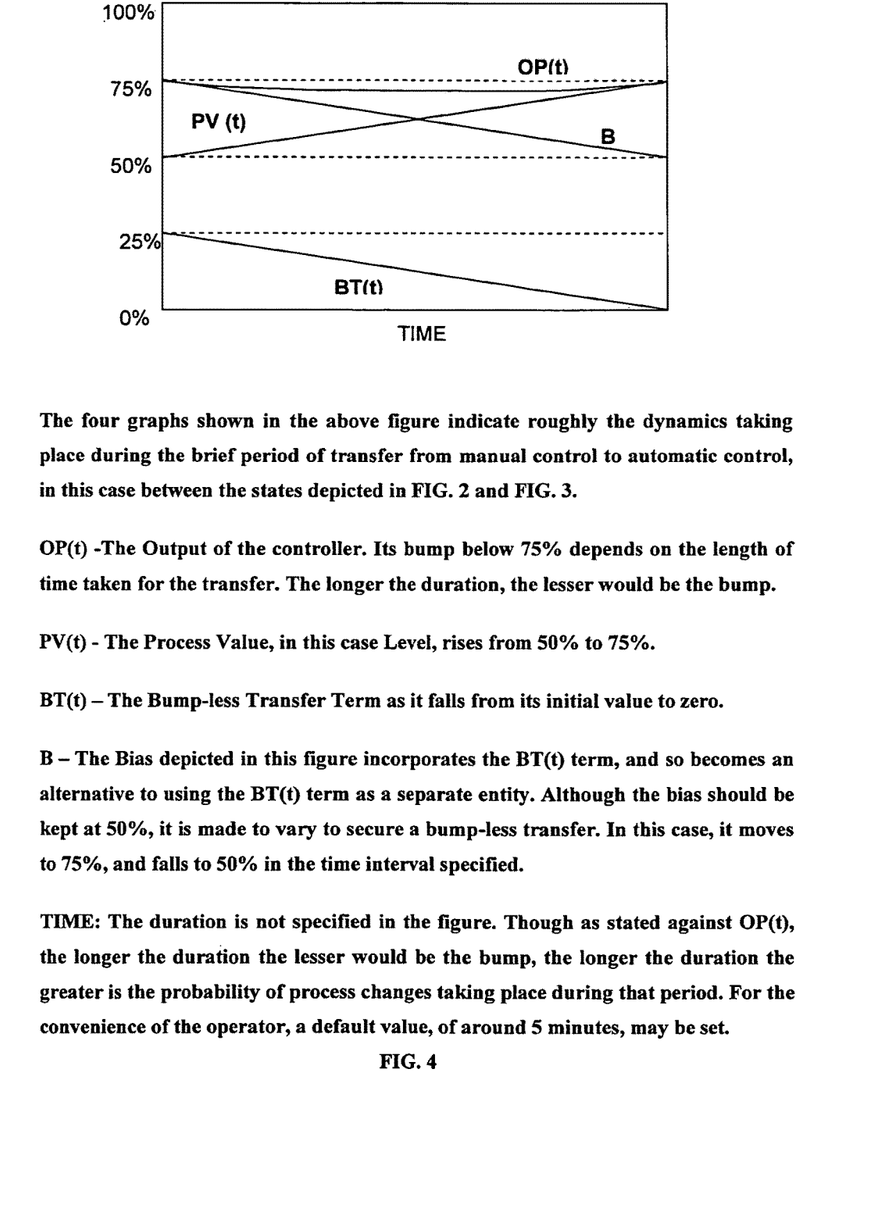
FIG. 4 is an illustration containing four graphs, showing the dynamics taking place during the brief period of transfer from manual control to automatic control, in this case between the states depicted in FIG. 2 and FIG. 3, with the aid of the present invention.

The four graphs shown in the above figure indicate roughly the dynamics taking place during the brief period of transfer from manual control to automatic control, in this case between the states depicted in FIG. 2 and FIG. 3.

OP(t) -The Output of the controller. Its bump below 75% depends on the length of time taken for the transfer. The longer the duration, the lesser would be the bump.

PV(t) - The Process Value, in this case Level, rises from 50% to 75%.

BT(t) – The Bump-less Transfer Term as it falls from its initial value to zero.

B – The Bias depicted in this figure incorporates the BT(t) term, and so becomes an alternative to using the BT(t) term as a separate entity. Although the bias should be kept at 50%, it is made to vary to secure a bump-less transfer. In this case, it moves to 75%, and falls to 50% in the time interval specified.

TIME: The duration is not specified in the figure. Though as stated against OP(t), the longer the duration the lesser would be the bump, the longer the duration the greater is the probability of process changes taking place during that period. For the convenience of the operator, a default value, of around 5 minutes, may be set.

BUMP-LESS TRANSFER TERM FOR PROPORTIONAL ACTION CONTROLLERS THAT ESCHEW THE INTEGRAL ACTION TERM

FIELD OF THE INVENTION

The present invention relates generally to a method and system for controllers. More specifically, this invention is a method to secure a bump-less transfer from Manual control to Automatic control for Proportional action controllers that avoid using for level controls the Integral action term, since it is liable to cause overflows from vessels, by employing in its place a novel bump-less transfer term that lasts for just a short period.

BACKGROUND OF THE INVENTION

In control engineering, an error signal is derived in response to a measurement of a parameter it is desired to control. An automatic control signal is then derived from the error signal by a controller and used to control some aspect of the system to compensate the error. In its simplest form, this control signal is made to be Proportional (P) to the error signal. However, quite often components of the error signal are also produced.

These are the first order Derivative (D) and Integral (I) of the error signal. Controllers which employ these components are usually called Proportional plus Derivative (P+D) and Proportional plus Integral (P+I) controllers. It is also possible to have a three term controller, i.e. Proportional plus Integral plus Derivative (P+I+D or PID) controller.

The derivative component is used if it is desired to reduce the lag (increase the response time of the system). Integral control is used primarily to eliminate offset, i.e. failure of the controlled parameter to return to the exact set point.

In the implementation of such an automatic control system, the process is normally put on manual control before it is transferred to automatic control. During such a transfer, Integral action plays an indispensable part for a bump-less transfer, but for Proportional only controllers there is no Integral action term for such support.

Some may be of the view that Proportional plus Integral control may be used whenever bum-less transfer is required, instead of employing Proportional action only control, and so there is no real necessity for Proportional action only controllers. However, this is not so, as varying dead-times, which are often caused by sticky control valves, have a deleterious effect on control systems. Hence, as Integral action increases the lag in a system, the preferred choice is Proportional only control for level controls, unless continued deviation from the set-point is totally unacceptable. Moreover, one has to be extremely wary of the Integral action time set, as any unsuitability will not be tolerated in level controls as in flow, pressure, and temperature, since it leads to overflows. To alleviate this, control engineers sometimes even double the gain. Further, it should be noted that vessels that require proportional action only control, often serve merely as intermediaries or buffers. So, having integral action in them impedes their objective. Hence, for level controls, Proportional action only control is often the norm. So, in summary, because there is no integral action to secure a bump-less transfer for Proportional action controllers that deliberately avoid using the integral action term, a novel term or method is required to secure a bump-less transfer, which is what this invention provides.

SUMMARY OF THE INVENTION

The present invention provides a novel method for securing a bump-less transfer from Manual control to Automatic control for Proportional action controllers that avoid the use of the Integral action term when the system is on automatic control, because of the propensity of the Integral action term in level controls to cause overflows from vessels. The method calls for a novel bump-less transfer term 'BT(t)' that exists for just a short period to secure a bump-less transfer, and then returns the system to its Proportional action only control state. This novel 'BT(t)' term consists of two components, a magnitude, and a bleed rate. The magnitude is automatically calculated in the control system to match the manual output of the controller during the transfer from manual control to automatic control. The basic equation for determining the initial magnitude of 'BT(t)' for a direct acting controller is as follows:

$BT(t)=OP(m)-K(PV(t)-SP)-B$ with the value of B fixed at 50%.

While, the basic equation for determining the initial magnitude of 'BT(t)' for a reverse acting controller is as follows:

$BT(t)=OP(m)+K(PV(t)-SP)-B$ with the value of B fixed at 50%.

The bleed rate, being the time taken for the magnitude of 'BT(t)' to fall from its initial value to zero, is set externally by the process control engineer, in the same way the set-point 'SP', and the gain 'K' of a controller are set; which, however, for the convenience of the operator could be given a default value of perhaps 5 minutes.

To avoid this novel 'BT(t)' term being seen as a separate entity, the term may be incorporated into the bias value 'B', which is set at 50%, or may be deemed as such.

Further, since the bleed rate for the Bump-less Transfer term BT(t) is a difficult value to determine, the control system could alternatively call for the required value, automatically calculated by the control system, the level should be manually brought to, before its transfer to automatic control, to make the transfer utterly bump-less.

Although all the construction of this novel method of bump-less transfer from manual control to automatic control lies entirely in the formulae, for a better understanding of this novel term, some drawings are provided, showing selected responses. Hence, these drawings do not curtail the coverage of the present invention, nor are they perfect from other aspects.

DETAILED DESCRIPTION OF THE INVENTION

Whenever a process control system is transferred from manual control to automatic control it is generally required to make the transfer bump-less, i.e. ensuring there is no change in process values when the transfer from manual control to automatic control is made.

For proportional plus integral action control and proportional plus integral plus derivative action (PID) control, there is no difficulty in achieving this, because the integral action term can smoothly accomplish this. However, for proportional action only (P only) controllers, and proportional plus derivative (P+D) action controllers no such smooth solution exists at present.

Hence, makers of Distributed Control Systems (DCS) do not provide an easy, convenient way to secure bump-less transfers for such controllers, suitable for the plant operators. However, when they claim they do, they go about it in the wrong way, leading to lopsided controls, often to the confusion and dismay of the unsuspecting user.

In order to explain the preferred embodiment for a bump-less transfer for a proportional controller without integral action according to the present innovation, it is necessary to resort to a mathematical description. In the formulae used the terms employed are defined as follows:

OP(t) Output of the controller in percent (time varying)
OP(m) Manual value of Output in percent
K Gain of the controller
PV(t) Process Value in percent (time varying)
SP Set Point in percent
BT(t) Bump-less Transfer term in percent (time varying)
B Bias value in percent (normally 50%)
T Sampling interval
OPn Output in percent at the nth sampling interval
Td Derivative action time
$T_i$ Integral action time
$BT_n$ Bump-less Transfer term at the nth sampling interval
$e_k$ error (PV–SP) at the kth sampling interval
$e_n$ error (PV–SP) at nth sampling interval
$e_{n-1}$ error (PV–SP) at (n–1) th sampling interval The output of a direct acting proportional controller follows the equation:

$$OP(t)=K(PV(t)-SP)+B \qquad (1)$$

While the output of a reverse acting proportional controller follows the equation:

$$OP(t)=-K(PV(t)-SP)+B \qquad (2)$$

Figure 1:
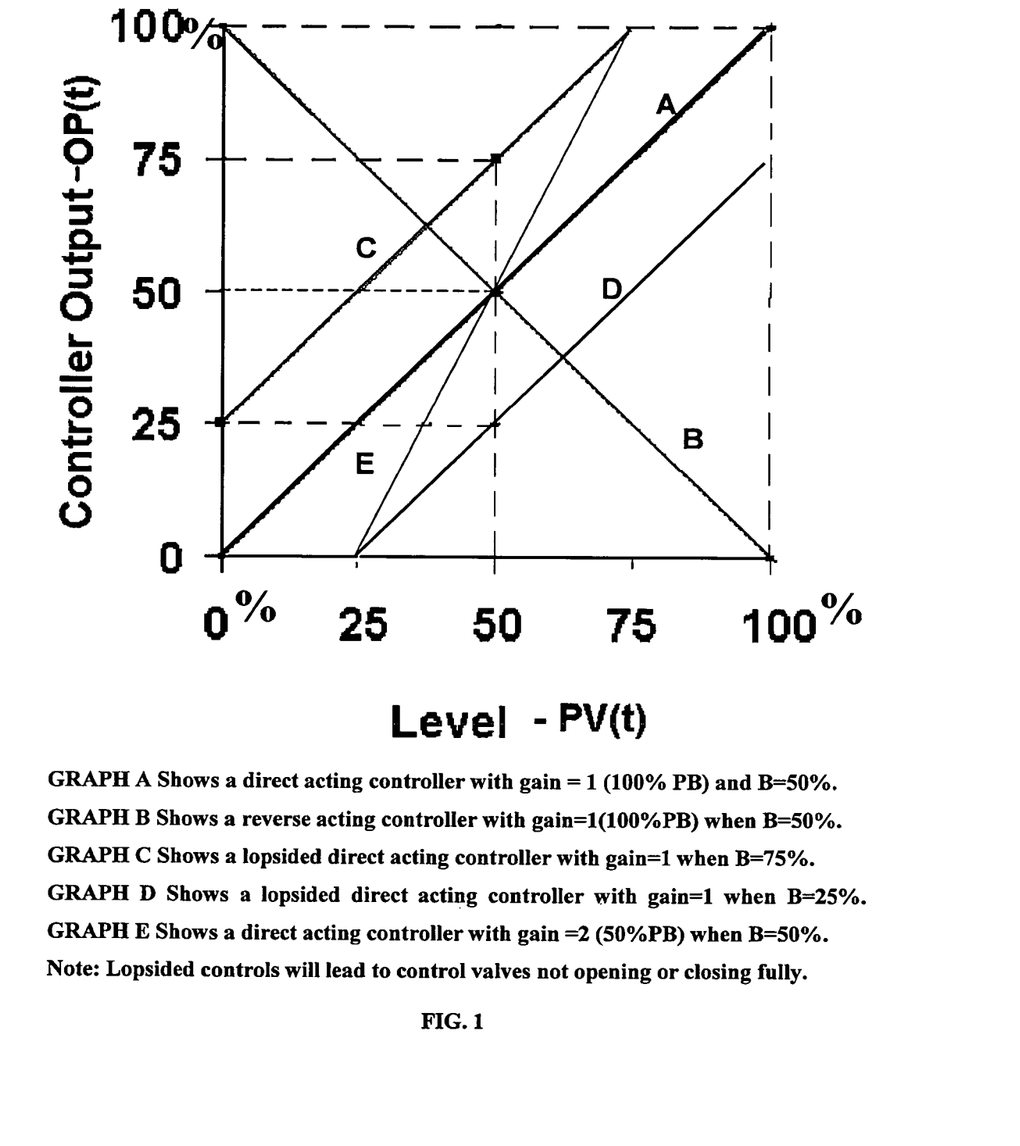
FIG. 1 is an illustration with graphs showing the Controller Output-OP(t) vs. Level-PV(t) for a Proportional only controller, without any intervention from this innovation.

For a good control system, it is essential that the bias value 'B' be kept at 50%, as can be seen from the several graphs shown in FIG. 1. However, for a bump-less transfer from manual control to automatic control, where the manual output may be from 0% to 100%, keeping the bias value 'B' at a constant value of 50%, would mean that bump-less transfer cannot be achieved, using the above control equations. Hence, some makers of Distributed Control Systems appear to have allowed the bias value to be floating over the full range, to enable a bump-less transfer to take place. However, this means, good proportional action control will not take place unless this floating bias by chance happens to be around 50%. To overcome this conflicting requirement for good proportional action control and bump-less transfer, a novel method of control, using an additional term in the control equation, is introduced. This additional term may be called as the Bump-less Transfer term, 'BT(t)'.

The additional term 'BT(t)' in the control equation has a magnitude as well as what may be called as the bleed rate. This bleed rate is given in minutes or in seconds, and it should be set, like integral and derivative action rates by the process control engineer. The initial value of 'BT(t)' depends on the manual value of the output before the bump-less transfer to automatic control. Hence, the magnitude of 'BT(t)' is internally set, and is not externally set as its bleed rate.

Thus, the control equation for a direct acting proportional controller becomes as follows:

$$OP(t)=K(PV(t)-SP)+B+BT(t) \qquad (3)$$

While, for a reverse acting proportional controller the equation becomes as follows:

$$OP(t)=-K(PV(t)-SP)+B+BT(t) \qquad (4)$$

Where the initial magnitude of 'BT(t)' is set internally, and is dependent on the manual value of output before bump-less transfer to automatic control. Hence, if PV(t) = SP, and the value of the manual output 'OP(m)' were to be 75%, the magnitude of 'BT(t)' will automatically be internally set as follows:—BT(t)=OP(m)–B=75%–50%=25%. However, the bleed rate of 'BT(t)' will be set externally by the process control engineer. The bleed rate determines how slowly or quickly the magnitude of 'BT(t)' falls at the same rate from its initial value to zero. Once the magnitude of 'BT(t)' is reduced to nothing, it remains zero for the rest of the time the system is on automatic control.

For a better understanding, the sampled data discrete DCS form of the equations using the Bump-less Transfer term 'BT(t)' is now compared with controllers having the integral action term, as controllers with integral action do not require the 'BT(t)' term.

The equations for these are given below for the direct acting controllers:

$$OP_n = Ke_n + KT/Ti\sum_{k=1}^{n} e_k + B \text{ (for P+1 control)} \qquad (5)$$

$$OP_n = Ke_n + B + BT_n \text{ (for P only control)} \qquad (6)$$

From the equation of the P+I controller it can be seen how the output can be easily varied to match the manual output by varying the error value summation in the integral action term without varying 'B' the bias value. Hence, the bias value of 50% need not be compromised. However, for P only control, this facility is not available for bump-less transfer from manual control to automatic control. Thus the need for the additional 'BT(t)' term to facilitate the transfer, but in some DCS, as stated earlier, the bias value appears to have been varied, because of the unavailability of the integral action term in P only control. This brings about a lopsided control, as may be seen in FIG. 1, Graphs C and D. In some DCS set-ups, the bias value 'B' appears to have varied even in P+I controllers to match the manual value of output 'OP(m)'. Perhaps, this is because it is much easier to program a control system for bump-less transfer by varying the bias value rather than by the summation of errors.

These programmers are apparently not fully conversant with control theory and do not realize that they have brought on a lopsided control, since they may go unidentified in P+I controllers, in spite of them setting an irremediable error for the setting of suitable integral action times. However, for P only controllers the consequence will be totally unacceptable as shown in FIG. 1, Graphs C and D.

P+D controllers are rarely used, as whenever derivative action is used the integral term is invariably used. Further, the transfer from manual control to automatic control is usually done in the steady state. Hence, there will be no difference in the error at the nth sampling interval and the (n−1)th sampling interval, and so the derivative action term will be zero. If this is not so, it is still advisable to neglect the term as it is small. Hence, at this stage it can be quite insignificant. However, for purely academic reasons, and if it is not ignored, the initial value of 'BTn' for a direct acting controller would be as follows:

$$BTn=OP(m)-B-Ke_n-KTd/T(e_n-e_{n-1}) \text{(with } B=50\%) \quad (7)$$

Some may be of the view, that because of the difficulty in securing bump-less transfer for proportional control without integral action, why not, always have proportional plus integral action, or at least whenever it required to have bump-less transfer from manual control to automatic control. However, integral action has a serious side effect, which makes it not always that desirable. Let us therefore examine what this is. The primary reason for having integral action is to eliminate offset. Hence, it was originally known as reset action.

However, the side effect is, when there is a process change, because of the integral action term it is unable to respond proportionately at once to the process change. This, in some cases can lead to oscillations about the set point while trying to arrive at the set point, or to even a process upsets. Thus, proportional control without integral action is sometimes necessary to bring about stability to a system. In the case of level control, it can also lead to an overflow from a vessel or to its emptying. To overcome this, an increase in vessel height, with width unchanged, may be required for P+I control than when using proportional only control. Further, as it is often hard to find a suitable integral action time, it is best to avoid integral action, unless control without offset is essential.

Since in the control of level, precise control at a particular level is very rarely needed, proportional control without integral action is almost always used for greater stability. Hence, for a further understanding of this novel method of control using the additional term 'BT(t)' for bump-less transfer, a level control application will now be considered. Suppose, for a certain flow into a tank, the control valve has to be opened 75%, so that the level in the tank neither rises or falls, then the output to the control valve has to be 75%. Thus, if a plant operator had brought the level to 50% as shown in FIG. 2, because the set-point of the controller is at 50%, then PV(t)−SP will be 50%−50%=0. If at this point the control was switched from manual control to automatic, then BT(t) would have to be 25% at the time of switching from manual to auto in order to match the output value, since the bias value remains fixed at 50%. However, it may be noted that, PV(t) does not have to be equal to SP when the bump-less transfer is made, as the initial magnitude of BT(t) would be adjusted according to the equation:

$$BT(t)=OP(m)-K(PV(t)-SP)-B \text{(for a direct acting controller)} \quad (8)$$

Now, suppose the bleed rate of 'BT(t)' is set at 5 minutes, then as the magnitude of BT(t) falls, the value of OP(t) also falls, causing the valve to close slightly. This in turn causes the level to rise, which in turn will cause PV(t) to be greater than SP. This will increase the value of OP(t). Thus slowly after 5 minutes the magnitude of 'BT(t)' would be reduced to zero from its initial value set internally at 25%. However, since the value of PV(t) would have risen to 75%, by the time BT(t) had fallen to zero, for a direct acting proportional controller with a gain of 1, the output remains at 75% as can be seen in the following equation:

$$OP(t)=K(PV(t)-SP)+B=1(75-50)+50=75. \quad (9)$$

The equation also shows there will be an offset from the Set Point. However, this offset of 25% from the set point is perfectly acceptable for a proportional only controller that has a gain of one. FIG. 3 shows the level in the tank when BT(t)=0 after transfer from manual control to automatic control. Without the 'BT(t)' term, a plant operator has to know the gain of the controller and calculate the required process value for a bump-less transfer that will be suitable for the manual output. This is difficult for the plant operators and so it is not preferred. Hence, some DCS makers have resorted to a floating bias to match the manual output of the controller, instead of the fixed bias of 50%. This, results in a lopsided control system, as noted earlier. Thus, to secure a bump-less transfer, it is necessary for an additional term 'BT(t)' be included in the control algorithm of all proportional action controllers that do not have the integral action term. Since the initial magnitude of BT(t) before bump-less transfer is done internally by the computer and the bleed rate of the BT(t) term is set by the control engineer, the plant operator has nothing to calculate.

For a fuller understanding of the problems involved, and how by using the new 'BT(t)' term the present shortcomings are overcome, FIG. 1 to FIG. 4 have to been drawn to illustrate.

FIG. 1 shows five graphs. Graph A shows the level input versus the controller output for a direct acting controller with a gain of 1 and a bias value of 50%. Graph B shows a reverse acting controller with a gain of 1 and a bias value of 50%. Graph C shows a direct acting controller with a gain of 1 but with the bias set at 75%. From graph C it can be easily seen why when the bias value of a controller is set at other than the mid-range value of 50%, it will result in a lopsided control system that is unacceptable. Graph D shows another lopsided control system, with the bias is set at 25%. Graph E shows a proportional control with the bias correctly at the mid-range, but with a gain of 2, which is sometimes used to try and overcome overflows. A controller with a gain of 2 is termed as having a 50% proportional band (PB), while a gain of 1 is termed 100% PB.

FIG. 2 shows a level control system at the time of transfer from manual control to automatic control.

FIG. 3 shows the same system when the value of BT(t) is zero, by which time the level in the tank has risen to 75%, assuming the flow into the tank has remained the same. The system consists of a tank (1) containing a liquid (2). It is filled from an uncontrolled liquid conduit (3), and it is desired to maintain the liquid between 0% and 100%. To this end a displacer type of level sensing element (4), a level transmitter (5), and a DCS controller (6), are connected to a current to pneumatic positioner of a control valve (7). The controller, in this case, is made to be a direct acting proportional only controller with a gain of 1 and a set-point of 50%. Such a controller will ensure that the system is controlled between the prescribed limits, in this case between 0% and 100%. Thus, the control valve opens proportionately more as the controller output 'OP(t)' increases. Suppose the level in the tank was 50%, matching the set-point, and the manual output was 75%, for a bump-less transfer to take place the output of the controller has also to be 75%. However, this value cannot be achieved unless the bias value was also set at 75%, since the other portions of equation 1 contribute to zero at the mid-range value of 50% as, PV(t)−SP=50%− 50%=0, at the time of transfer from manual control to automatic control. But, as can be seen in graph C of FIG. 1, a bias value of 75% will result in a lopsided control system that is unacceptable. Thus, if the bias value was at 75% for the proportional only controller, the outlet valve will not close shut, as it should, even when the level had fallen to zero percent. This will lead to emptying the tank. On the other hand if the bias value was required to be set at 25%, the outlet control valve will not open fully, as can be seen from graph D, even when the level in the tank has exceeded 100%. This will lead to an overflow in the tank. Hence, the system will not be controlled between the set limits, if we have a variable bias, unless it acts only for, comparatively an extremely short period as shown in FIG. 4. Thus, we have no choice but to have this new Bump-less Transfer BT(t) term, which, in this case adds another 25% to the output, but which lasts for just a short period. Then, as the BT(t) term gradually goes down to zero, the level too rises gradually to compensate, as the valve closes marginally below the final value before the transfer is complete. What takes place during the brief period of transfer is better understood through the four graphs in FIG. 4, and the few words deciphering them, given therein. Thus, for all proportional action controllers that do not like having an integral action term during continuous control, with the new Bump-less Transfer term introduced into the control equation, the bias value 'B' at the mid-range value of 50% is not compromised, and proper control is maintained.

FIG. 4 shows four graphs, which indicate roughly the dynamics taking place during the brief period of transfer from manual control to automatic control, in this case between the states depicted in FIG. 2 and FIG. 3. OP(t): The Output of the controller; its bump below 75% depends on the length of time chosen for the transfer. The longer the duration, the lesser would be the bump. PV(t): The Process Value, in this case Level, rises from 50% to 75%. BT(t): The Bump-less Transfer Term as it falls from its initial magnitude to zero. B: The Bias depicted in the figure incorporates the BT(t) term, and so becomes an alternative to using the BT(t) term as a separate entity. Although the bias should be kept at 50%, it is made to vary to secure a bump-less transfer. In this case, it moves to 75%, and returns to 50% in the time interval specified. TIME: The duration is not specified in the figure. Though, as stated against OP(t), the longer the duration the lesser would be the bump, the longer the duration the greater is the probability of process changes occurring during that period. For the convenience of the operator a default value of 5 minutes may be set, as this is likely to be an acceptable value for most processes.

Although the invention has been explained in relation to its preferred embodiment, it is to be understood that other possible modifications and variations can be made without departing from the spirit and scope of the invention as hereinafter claimed.

What is claimed is:

1. A method of securing a bump-less transfer from manual control to automatic control for processes controllers, comprising a term that secures a bump-less transfer without using Proportional plus Integral action controllers, known by the acronyms P+I or PI controllers, for level controls, and using only Proportional action controllers for said controls, due to the liability of the integral action term to cause overflows from vessels, occasionally disastrous oil-spills, when a process is on automatic control, because control at a set-point, which necessitates the integral action term, is not required for level controls, by including in the place of the integral action term, which had conveniently also served to secure a bump-less transfer, a novel Bump-less Transfer 'BT(t)' term into the control algorithm, which enables a bum-less transfer, by bringing the level in the vessel to the level required for a bump-less transfer, while keeping the bias value 'B' fixed at its necessary 50% value; via said 'BT(t)' term having two components:

1) an initial magnitude,
2) a bleed rate;

with the initial magnitude of said 'BT(t)' term, determined automatically, by the inclusion of an equation for the automatic determination of said 'BT(t)' term, in the distributed control system (DCS) of the assigned computer, which said 'BT(t)' term, is the difference in value between said process value 'PV(t)', in percent (time varying), which said process is said level in said vessel, and the manual value of output in percent, 'OP(m)', and thus the basic equation for automatically determining the initial magnitude of said 'BT(t)' term for a direct acting controller is as follows:

$$BT(t)=OP(m)-K(PV(t)-SP)-B \text{ with the value of B fixed at 50\%,}$$

and the basic equation for automatically determining the initial magnitude of said 'BT(t)' term for a reverse acting controller is as follows:

$$BT(t)=OP(m)+K(PV(t)-SP)-B \text{ with the value of B fixed at 50\%,}$$

while the bleed rate, being the time taken for the magnitude of said 'BT(t)' term to fall from its initial value to zero, is set externally by the process control engineer, in the same way the set-point 'SP', and the gain 'K' of a controller are set, is preset a default value of 5 minutes.

2. The method of claim 1, but wherein, said 'BT(t)' term is incorporated into said bias 'B', during said preset period of time for transfer from manual to automatic control, as follows: the said bias 'B' itself is moved to match the value required for a bump-less transfer, and then is brought back to the required 50% value, within a fixed preset period of time, and so, said 'BT(t)' term, need not be as a separate entity, but is instead incorporated into the said bias 'B', for said preset period of time required for the said transfer from manual control to automatic control, and so would appear for said preset period of time, as a varying bias, and thus for direct acting controllers, said bias 'B', would, for said preset period of time, be BT(t)+B, and for reverse acting controllers, said bias 'B', would, for said preset period of time, be BT(t)−B.

3. The method of claim 1, wherein, because the said bump-less transfer term, 'BT(t)', does not ensure a totally bump-free transfer of control from manual control to automatic control, a manual method is employed, which manual method calls for the required level, the level in the said vessel should be brought to, deduced from the said manual output, 'OP(m)', said level is manually brought to, through manual facilities, wherever needed, before it is transferred to automatic control to make the transfer utterly bump-less.

* * * * *

UNITED STATES PATENT AND TRADEMARK OFFICE
CERTIFICATE OF CORRECTION

PATENT NO.        : 9,651,923 B2
APPLICATION NO.   : 14/316807
DATED             : May 16, 2017
INVENTOR(S)       : Pakianathan It is certified that error appears in the above-identified patent and that said Letters Patent is hereby corrected as shown below:

Please delete Patent No. 9,651,923 B2 in its entirety and insert Patent No. 9,651,923 B2 as shown on the attached pages.

Signed and Sealed this
First Day of May, 2018

Andrei Iancu
*Director of the United States Patent and Trademark Office*

(12) United States Patent
Pakianathan (10) Patent No.: US 9,651,923 B2
(45) Date of Patent: May 16, 2017

(54) BUMP-LESS TRANSFER TERM FOR PROPORTIONAL ACTION CONTROLLERS THAT ESCHEW THE INTEGRAL ACTION TERM

(71) Applicant: Manuel Jesubatham Pakianathan, Singapore (SG)

(72) Inventor: Manuel Jesubatham Pakianathan, Singapore (SG)

( * ) Notice: Subject to any disclaimer, the term of this patent is extended or adjusted under 35 U.S.C. 154(b) by 59 days.

(21) Appl. No.: 14/316,807

(22) Filed: Jun. 27, 2014

(65) Prior Publication Data

US 2015/0134084 A1    May 14, 2015

(51) Int. Cl.
*G06F 19/00*    (2011.01)
*G05B 11/38*    (2006.01)

(52) U.S. Cl.
CPC .................................. *G05B 11/38* (2013.01)

(58) Field of Classification Search
USPC .................... 700/45, 29, 20, 108, 292, 8, 44
See application file for complete search history.

(56) References Cited

U.S. PATENT DOCUMENTS

| | | | | |
|---|---|---|---|---|
| 4,035,620 A | * | 7/1977 | Hobbs | G05B 7/02 318/591 |
| 4,036,011 A | * | 7/1977 | Gupta | F01K 9/023 137/599.07 |
| 5,504,672 A | * | 4/1996 | Hardiman | G05B 11/42 700/44 |
| 5,867,384 A | * | 2/1999 | Drees | G05B 5/01 700/42 |
| 6,122,605 A | * | 9/2000 | Drees | G05B 5/01 327/311 |

FOREIGN PATENT DOCUMENTS

WO    2004012017    *  2/2004

OTHER PUBLICATIONS

Hagglund, Supervision of adaptive control algorithms, 2000, Lund Institute of Technology, p. 1171-1180.*
Gareli et al., A bumpless method for multivariable process controllers viasliding mode, Jun. 5-7, 2006, International Workshop on Variable Structure Systems , Alghero, Italy, p. 121-126.*

* cited by examiner

*Primary Examiner* — Kidest Bahta

(57) ABSTRACT

In automatic process-control systems, the integral action term in Proportional plus Integral action (P+I) control is used primarily to prevent any continued deviations from a set-point, and concomitantly to secure a bump-less transfer from manual control to automatic control. However, there are serious set-backs when using the integral action term for level controls, due to the liability of the integral action term to cause overflows from vessels, which can result in disastrous oil-spills, when a process is on automatic control. Hence, to secure a bump-less transfer without the integral action term, an alternate method is necessary. The method advocated calls for an additional term, which has been termed as a Bump-less Transfer 'BT(t)' term, to be included into the control algorithm. This term accepts deviations from the set-point, and even brings about sufficient deviation from the set-point to secure a bump-less transfer, since deviations within the proportional band are normally acceptable for level controls.

3 Claims, 4 Drawing Sheets

LEVEL CONTROL AFTER THE BUMP-LESS TRANSFER TERM BT(t) IS REDUCED TO ZERO AFTER A SHORT DURATION THAT DEPENDS ON THE BLEED RATE OF BT(t), WHICH IS COMPENSATED BY THE LEVEL RISING TO 75%, DUE TO THE VALVE CLOSING SLIGHTLY MORE DURING THAT PERIOD, THEREBY BRINGING ABOUT SUFFICIENT DEVIATION FROM THE SET-POINT TO SECURE A BUMP-LESS TRANSFER.

GRAPH A Shows a direct acting controller with gain = 1 (100% PB) and B=50%.

GRAPH B Shows a reverse acting controller with gain=1(100%PB) when B=50%.

GRAPH C Shows a lopsided direct acting controller with gain=1 when B=75%.

GRAPH D Shows a lopsided direct acting controller with gain=1 when B=25%.

GRAPH E Shows a direct acting controller with gain =2 (50%PB) when B=50%.

Note: Lopsided controls will lead to control valves not opening or closing fully.

FIG. 1

LEVEL JUST BEFORE BUMP-LESS TRANSFER TO AUTOMATIC CONTROL WITH THE MAGNITUDE OF BT(t) AUTOMATICALLY SET SO THAT BT(t) + B IS EQUAL TO THE MANUAL OUTPUT TO THE CONTROL VALVE BEFORE THE TRANSFER.

FIG. 2

LEVEL CONTROL AFTER THE BUMP-LESS TRANSFER TERM BT(t) IS REDUCED TO ZERO AFTER A SHORT DURATION THAT DEPENDS ON THE BLEED RATE OF BT(t), WHICH IS COMPENSATED BY THE LEVEL RISING TO 75%, DUE TO THE VALVE CLOSING SLIGHTLY MORE DURING THAT PERIOD, THEREBY BRINGING ABOUT SUFFICIENT DEVIATION FROM THE SET-POINT TO SECURE A BUMP-LESS TRANSFER.

FIG. 3

The four graphs shown in the above figure indicate roughly the dynamics taking place during the brief period of transfer from manual control to automatic control, in this case between the states depicted in FIG. 2 and FIG. 3.

OP(t) -The Output of the controller. Its bump below 75% depends on the length of time taken for the transfer. The longer the duration, the lesser would be the bump.

PV(t) - The Process Value, in this case Level, rises from 50% to 75%.

BT(t) – The Bump-less Transfer Term as it falls from its initial value to zero.

B – The Bias depicted in this figure incorporates the BT(t) term, and so becomes an alternative to using the BT(t) term as a separate entity. Although the bias should be kept at 50%, it is made to vary to secure a bump-less transfer. In this case, it moves to 75%, and falls to 50% in the time interval specified.

TIME: The duration is not specified in the figure. Though as stated against OP(t), the longer the duration the lesser would be the bump, the longer the duration the greater is the probability of process changes taking place during that period. For the convenience of the operator, a default value, of around 5 minutes, may be set.

FIG. 4

BUMP-LESS TRANSFER TERM FOR PROPORTIONAL ACTION CONTROLLERS THAT ESCHEW THE INTEGRAL ACTION TERM

FIELD OF THE INVENTION

The present invention relates generally to a method and system for controllers. More specifically, this invention is a method to secure a bump-less transfer from Manual control to Automatic control for Proportional action controllers that avoid using for level controls the Integral action term, since it is liable to cause overflows from vessels, by employing in its place a novel bump-less transfer term that lasts for just a short period.

BACKGROUND OF THE INVENTION

In control engineering, an error signal is derived in response to a measurement of a parameter it is desired to control. An automatic control signal is then derived from the error signal by a controller and used to control some aspect of the system to compensate the error. In its simplest form, this control signal is made to be Proportional (P) to the error signal. However, quite often components of the error signal are also produced.

These are the first order Derivative (D) and Integral (I) of the error signal. Controllers which employ these components are usually called Proportional plus Derivative (P+D) and Proportional plus Integral (P+I) controllers. It is also possible to have a three term controller, i.e. Proportional plus Integral plus Derivative (P+I+D or PID) controller.

The derivative component is used if it is desired to reduce the lag (increase the response time of the system). Integral control is used primarily to eliminate offset, i.e. failure of the controlled parameter to return to the exact set point.

In the implementation of such an automatic control system, the process is normally put on manual control before it is transferred to automatic control. During such a transfer, Integral action plays an indispensable part for a bump-less transfer, but for Proportional only controllers there is no Integral action term for such support.

Some may be of the view that Proportional plus Integral control may be used whenever bum-less transfer is required, instead of employing Proportional action only control, and so there is no real necessity for Proportional action only controllers. However, this is not so, as varying dead-times, which are often caused by sticky control valves, have a deleterious effect on control systems. Hence, as Integral action increases the lag in a system, the preferred choice is Proportional only control for level controls, unless continued deviation from the set-point is totally unacceptable. Moreover, one has to be extremely wary of the Integral action time set, as any unsuitability will not be tolerated in level controls as in flow, pressure, and temperature, since it leads to overflows. To alleviate this, control engineers sometimes even double the gain. Further, it should be noted that vessels that require proportional action only control, often serve merely as intermediaries or buffers. So, having integral action in them impedes their objective. Hence, for level controls, Proportional action only control is often the norm. So, in summary, because there is no integral action to secure a bump-less transfer for Proportional action controllers that deliberately avoid using the integral action term, a novel term or method is required to secure a bump-less transfer, which is what this invention provides.

SUMMARY OF THE INVENTION

The present invention provides a novel method for securing a bump-less transfer from Manual control to Automatic control for Proportional action controllers that avoid the use of the Integral action term when the system is on automatic control, because of the propensity of the Integral action term in level controls to cause overflows from vessels. The method calls for a novel bump-less transfer term 'BT(t)' that exists for just a short period to secure a bump-less transfer, and then returns the system to its Proportional action only control state. This novel 'BT(t)' term consists of two components, a magnitude, and a bleed rate. The magnitude is automatically calculated in the control system to match the manual output of the controller during the transfer from manual control to automatic control. The basic equation for determining the initial magnitude of 'BT(t)' for a direct acting controller is as follows:

$$BT(t)=OP(m)-K(PV(t)-SP)-B \text{ with the value of B fixed at 50\%.}$$

While, the basic equation for determining the initial magnitude of 'BT(t)' for a reverse acting controller is as follows:

$$BT(t)=OP(m)+K(PV(t)-SP)-B \text{ with the value of B fixed at 50\%.}$$

The bleed rate, being the time taken for the magnitude of 'BT(t)' to fall from its initial value to zero, is set externally by the process control engineer, in the same way the set-point 'SP', and the gain 'K' of a controller are set; which, however, for the convenience of the operator could be given a default value of perhaps 5 minutes.

To avoid this novel 'BT(t)' term being seen as a separate entity, the term may be incorporated into the bias value 'B', which is set at 50%, or may be deemed as such.

Further, since the bleed rate for the Bump-less Transfer term BT(t) is a difficult value to determine, the control system could alternatively call for the required value, automatically calculated by the control system, the level should be manually brought to, before its transfer to automatic control, to make the transfer utterly bump-less.

Although all the construction of this novel method of bump-less transfer from manual control to automatic control lies entirely in the formulae, for a better understanding of this novel term, some drawings are provided, showing selected responses. Hence, these drawings do not curtail the coverage of the present invention, nor are they perfect from other aspects.

BRIEF DESCRIPTION OF THE DRAWINGS

FIG. 1 is an illustration with graphs showing the Controller Output-OP(t) vs. Level-PV(t) for a Proportional only controller, without any intervention from this innovation.

FIG. 2 is an illustration of level just before bump-less transfer to Automatic control with the magnitude of BT(t) automatically set, so that BT(t)+b is equal to the manual output to the control valve before the transfer when employing this novel term.

FIG. 3 is an illustration of level control after the bump-less transfer term BT(t) is reduced to zero after a short duration that depends on the bleed rate of BT(t), which is offset by the level rising to 75%, due to the valve closing a bit more during that period.

FIG. 4 is an illustration containing four graphs, showing the dynamics taking place during the brief period of transfer from manual control to automatic control, in this case between the states depicted in FIG. 2 and FIG. 3, with the aid of the present invention.

DETAILED DESCRIPTION OF THE INVENTION

Whenever a process control system is transferred from manual control to automatic control it is generally required to make the transfer bump-less, i.e. ensuring there is no change in process values when the transfer from manual control to automatic control is made.

For proportional plus integral action control and proportional plus integral plus derivative action (PID) control, there is no difficulty in achieving this, because the integral action term can smoothly accomplish this. However, for proportional action only (P only) controllers, and proportional plus derivative (P+D) action controllers no such smooth solution exists at present.

Hence, makers of Distributed Control Systems (DCS) do not provide an easy, convenient way to secure bump-less transfers for such controllers, suitable for the plant operators. However, when they claim they do, they go about it in the wrong way, leading to lopsided controls, often to the confusion and dismay of the unsuspecting user.

In order to explain the preferred embodiment for a bump-less transfer for a proportional controller without integral action according to the present innovation, it is necessary to resort to a mathematical description. In the formulae used the terms employed are defined as follows:

OP(t) Output of the controller in percent (time varying)
OP(m) Manual value of Output in percent
K Gain of the controller
PV(t) Process Value in percent (time varying)
SP Set Point in percent
BT(t) Bump-less Transfer term in percent (time varying)
B Bias value in percent (normally 50%)
T Sampling interval
OPn Output in percent at the nth sampling interval
Td Derivative action time
$T_i$ Integral action time
$BT_n$ Bump-less Transfer term at the nth sampling interval
$e_k$ error (PV−SP) at the kth sampling interval
$e_n$ error (PV−SP) at nth sampling interval
$e_{n-1}$ error (PV−SP) at (n−1)th sampling interval The output of a direct acting proportional controller follows the equation:

$$OP(t)=K(PV(t)-SP)+B \quad (1)$$

While the output of a reverse acting proportional controller follows the equation:

$$OP(t)=-K(PV(t)-SP)+B \quad (2)$$

For a good control system, it is essential that the bias value 'B' be kept at 50%, as can be seen from the several graphs shown in FIG. 1. However, for a bump-less transfer from manual control to automatic control, where the manual output may be from 0% to 100%, keeping the bias value 'B' at a constant value of 50%, would mean that bump-less transfer cannot be achieved, using the above control equations. Hence, some makers of Distributed Control Systems appear to have allowed the bias value to be floating over the full range, to enable a bump-less transfer to take place. However, this means, good proportional action control will not take place unless this floating bias by chance happens to be around 50%. To overcome this conflicting requirement for good proportional action control and bump-less transfer, a novel method of control, using an additional term in the control equation, is introduced. This additional term may be called as the Bump-less Transfer term, 'BT(t)'.

The additional term 'BT(t)' in the control equation has a magnitude as well as what may be called as the bleed rate. This bleed rate is given in minutes or in seconds, and it should be set, like integral and derivative action rates by the process control engineer. The initial value of 'BT(t)' depends on the manual value of the output before the bump-less transfer to automatic control. Hence, the magnitude of 'BT(t)' is internally set, and is not externally set as its bleed rate.

Thus, the control equation for a direct acting proportional controller becomes as follows:

$$OP(t)=K(PV(t)-SP)+B+BT(t) \quad (3)$$

While, for a reverse acting proportional controller the equation becomes as follows:

$$OP(t)=-K(PV(t)-SP)+B+BT(t) \quad (4)$$

Where the initial magnitude of 'BT(t)' is set internally, and is dependent on the manual value of output before bump-less transfer to automatic control. Hence, if PV(t)=SP, and the value of the manual output 'OP(m)' were to be 75%, the magnitude of 'BT(t)' will automatically be internally set as follows: BT(t)=OP(m)−B=75%−50%=25%. However, the bleed rate of 'BT(t)' will be set externally by the process control engineer. The bleed rate determines how slowly or quickly the magnitude of 'BT(t)' falls at the same rate from its initial value to zero. Once the magnitude of 'BT(t)' is reduced to nothing, it remains zero for the rest of the time the system is on automatic control.

For a better understanding, the sampled data discrete DCS form of the equations using the Bump-less Transfer term 'BT(t)' is now compared with controllers having the integral action term, as controllers with integral action do not require the 'BT(t)' term.

The equations for these are given below for the direct acting controllers:

$$OP_n = Ke_n + KT/Ti\sum_{k=1}^{n} e_k + B \quad \text{(for P+1 control)} \quad (5)$$

$$OP_n = Ke_n + B + BT_n \quad \text{(for P only control)} \quad (6)$$

From the equation of the P+I controller it can be seen how the output can be easily varied to match the manual output by varying the error value summation in the integral action term without varying 'B' the bias value. Hence, the bias value of 50% need not be compromised. However, for P only control, this facility is not available for bump-less transfer from manual control to automatic control. Thus the need for the additional 'BT(t)' term to facilitate the transfer, but in some DCS, as stated earlier, the bias value appears to have been varied, because of the unavailability of the integral action term in P only control. This brings about a lopsided control, as may be seen in FIG. 1, Graphs C and D. In some DCS set-ups, the bias value 'B' appears to have varied even in P+I controllers to match the manual value of output 'OP(m)'. Perhaps, this is because it is much easier to program a control system for bump-less transfer by varying the bias value rather than by the summation of errors.

These programmers are apparently not fully conversant with control theory and do not realize that they have brought on a lopsided control, since they may go unidentified in P+I controllers, in spite of them setting an irremediable error for the setting of suitable integral action times. However, for P only controllers the consequence will be totally unacceptable as shown in FIG. 1, Graphs C and D.

P+D controllers are rarely used, as whenever derivative action is used the integral term is invariably used. Further, the transfer from manual control to automatic control is usually done in the steady state. Hence, there will be no difference in the error at the nth sampling interval and the (n−1)th sampling interval, and so the derivative action term will be zero. If this is not so, it is still advisable to neglect the term as it is small. Hence, at this stage it can be quite insignificant. However, for purely academic reasons, and if it is not ignored, the initial value of 'BTn' for a direct acting controller would be as follows:

$$BTn = OP(m) - B - Ke_n - KTd/T(e_n - e_{n-1})(\text{with } B = 50\%) \quad (7)$$

Some may be of the view, that because of the difficulty in securing bump-less transfer for proportional control without integral action, why not, always have proportional plus integral action, or at least whenever it required to have bump-less transfer from manual control to automatic control. However, integral action has a serious side effect, which makes it not always that desirable. Let us therefore examine what this is. The primary reason for having integral action is to eliminate offset. Hence, it was originally known as reset action.

However, the side effect is, when there is a process change, because of the integral action term it is unable to respond proportionately at once to the process change. This, in some cases can lead to oscillations about the set point while trying to arrive at the set point, or to even a process upsets. Thus, proportional control without integral action is sometimes necessary to bring about stability to a system. In the case of level control, it can also lead to an overflow from a vessel or to its emptying. To overcome this, an increase in vessel height, with width unchanged, may be required for P+I control than when using proportional only control. Further, as it is often hard to find a suitable integral action time, it is best to avoid integral action, unless control without offset is essential.

Since in the control of level, precise control at a particular level is very rarely needed, proportional control without integral action is almost always used for greater stability. Hence, for a further understanding of this novel method of control using the additional term 'BT(t)' for bump-less transfer, a level control application will now be considered. Suppose, for a certain flow into a tank, the control valve has to be opened 75%, so that the level in the tank neither rises or falls, then the output to the control valve has to be 75%. Thus, if a plant operator had brought the level to 50% as shown in FIG. 2, because the set-point of the controller is at 50%, then PV(t)−SP will be 50%−50%=0. If at this point the control was switched from manual control to automatic, then BT(t) would have to be 25% at the time of switching from manual to auto in order to match the output value, since the bias value remains fixed at 50%. However, it may be noted that, PV(t) does not have to be equal to SP when the bump-less transfer is made, as the initial magnitude of BT(t) would be adjusted according to the equation:

$$BT(t) = OP(m) - K(PV(t) - SP) - B(\text{for a direct acting controller}) \quad (8)$$

Now, suppose the bleed rate of 'BT(t)' is set at 5 minutes, then as the magnitude of BT(t) falls, the value of OP(t) also falls, causing the valve to close slightly. This in turn causes the level to rise, which in turn will cause PV(t) to be greater than SP. This will increase the value of OP(t). Thus slowly after 5 minutes the magnitude of 'BT(t)' would be reduced to zero from its initial value set internally at 25%. However, since the value of PV(t) would have risen to 75%, by the time BT(t) had fallen to zero, for a direct acting proportional controller with a gain of 1, the output remains at 75% as can be seen in the following equation:

$$OP(t) = K(PV(t) - SP) + B = 1(75 - 50) + 50 = 75. \quad (9)$$

The equation also shows there will be an offset from the Set Point. However, this offset of 25% from the set point is perfectly acceptable for a proportional only controller that has a gain of one. FIG. 3 shows the level in the tank when BT(t)=0 after transfer from manual control to automatic control. Without the 'BT(t)' term, a plant operator has to know the gain of the controller and calculate the required process value for a bump-less transfer that will be suitable for the manual output. This is difficult for the plant operators and so it is not preferred. Hence, some DCS makers have resorted to a floating bias to match the manual output of the controller, instead of the fixed bias of 50%. This, results in a lopsided control system, as noted earlier. Thus, to secure a bump-less transfer, it is necessary for an additional term 'BT(t)' be included in the control algorithm of all proportional action controllers that do not have the integral action term. Since the initial magnitude of BT(t) before bump-less transfer is done internally by the computer and the bleed rate of the BT(t) term is set by the control engineer, the plant operator has nothing to calculate.

For a fuller understanding of the problems involved, and how by using the new 'BT(t)' term the present shortcomings are overcome, FIG. 1 to FIG. 4 have to been drawn to illustrate.

FIG. 1 shows five graphs. Graph A shows the level input versus the controller output for a direct acting controller with a gain of 1 and a bias value of 50%. Graph B shows a reverse acting controller with a gain of 1 and a bias value of 50%. Graph C shows a direct acting controller with a gain of 1 but with the bias set at 75%. From graph C it can be easily seen why when the bias value of a controller is set at other than the mid-range value of 50%, it will result in a lopsided control system that is unacceptable. Graph D shows another lopsided control system, with the bias is set at 25%. Graph E shows a proportional control with the bias correctly at the mid-range, but with a gain of 2, which is sometimes used to try and overcome overflows. A controller with a gain of 2 is termed as having a 50% proportional band (PB), while a gain of 1 is termed 100% PB.

FIG. 2 shows a level control system at the time of transfer from manual control to automatic control.

FIG. 3 shows the same system when the value of BT(t) is zero, by which time the level in the tank has risen to 75%, assuming the flow into the tank has remained the same. The system consists of a tank (1) containing a liquid (2). It is filled from an uncontrolled liquid conduit (3), and it is desired to maintain the liquid between 0% and 100%. To this end a displacer type of level sensing element (4), a level transmitter (5), and a DCS controller (6), are connected to a current to pneumatic positioner of a control valve (7). The controller, in this case, is made to be a direct acting proportional only controller with a gain of 1 and a set-point of 50%. Such a controller will ensure that the system is controlled between the prescribed limits, in this case between 0% and 100%. Thus, the control valve opens proportionately more as the controller output 'OP(t)' increases. Suppose the level in the tank was 50%, matching the set-point, and the manual output was 75%, for a bump-less transfer to take place the output of the controller has also to be 75%. However, this value cannot be achieved unless the bias value was also set at 75%, since the other portions of equation I contribute to zero at the mid-range value of 50% as, PV(t)–SP=50%–50%=0, at the time of transfer from manual control to automatic control. But, as can be seen in graph C of FIG. 1, a bias value of 75% will result in a lopsided control system that is unacceptable. Thus, if the bias value was at 75% for the proportional only controller, the outlet valve will not close shut, as it should, even when the level had fallen to zero percent. This will lead to emptying the tank. On the other hand if the bias value was required to be set at 25%, the outlet control valve will not open fully, as can be seen from graph D, even when the level in the tank has exceeded 100%. This will lead to an overflow in the tank. Hence, the system will not be controlled between the set limits, if we have a variable bias, unless it acts only for, comparatively an extremely short period as shown in FIG. 4. Thus, we have no choice but to have this new Bump-less Transfer BT(t) term, which, in this case adds another 25% to the output, but which lasts for just a short period. Then, as the BT(t) term gradually goes down to zero, the level too rises gradually to compensate, as the valve closes marginally below the final value before the transfer is complete. What takes place during the brief period of transfer is better understood through the four graphs in FIG. 4, and the few words deciphering them, given therein. Thus, for all proportional action controllers that do not like having an integral action term during continuous control, with the new Bump-less Transfer term introduced into the control equation, the bias value 'B' at the mid-range value of 50% is not compromised, and proper control is maintained.

FIG. 4 shows four graphs, which indicate roughly the dynamics taking place during the brief period of transfer from manual control to automatic control, in this case between the states depicted in FIG. 2 and FIG. 3. OP(t): The Output of the controller; its bump below 75% depends on the length of time chosen for the transfer. The longer the duration, the lesser would be the bump. PV(t): The Process Value, in this case Level, rises from 50% to 75%. BT(t): The Bump-less Transfer Term as it falls from its initial magnitude to zero. B: The Bias depicted in the figure incorporates the BT(t) term, and so becomes an alternative to using the BT(t) term as a separate entity. Although the bias should be kept at 50%, it is made to vary to secure a bump-less transfer. In this case, it moves to 75%, and returns to 50% in the time interval specified. TIME: The duration is not specified in the figure. Though, as stated against OP(t), the longer the duration the lesser would be the bump, the longer the duration the greater is the probability of process changes occurring during that period. For the convenience of the operator a default value of 5 minutes may be set, as this is likely to be an acceptable value for most processes.

Although the invention has been explained in relation to its preferred embodiment, it is to be understood that other possible modifications and variations can be made without departing from the spirit and scope of the invention as hereinafter claimed.

What is claimed is:

1. A method of securing a bump-less transfer from manual control to automatic control for processes controllers, comprising a term that secures a bump-less transfer without using Proportional plus Integral action controllers, known by the acronyms P+I or PI controllers, for level controls, and using only Proportional action controllers for said controls, due to the liability of the integral action term to cause overflows from vessels, occasionally disastrous oil-spills, when a process is on automatic control, because control at a set-point, which necessitates the integral action term, is not required for level controls, by including in the place of the integral action term, which had conveniently also served to secure a bump-less transfer, a novel Bump-less Transfer 'BT(t)' term into the control algorithm, which enables a bum-less transfer, by bringing the level in the vessel to the level required for a bump-less transfer, while keeping the bias value 'B' fixed at its necessary 50% value; via said 'BT(t)' term having two components:

1) an initial magnitude,
2) a bleed rate;

with the initial magnitude of said 'BT(t)' term, determined automatically, by the inclusion of an equation for the automatic determination of said 'BT(t)' term, in the distributed control system (DCS) of the assigned computer, which said 'BT(t)' term, is the difference in value between said process value 'PV(t)', in percent (time varying), which said process is said level in said vessel, and the manual value of output in percent, 'OP(m)', and thus the basic equation for automatically determining the initial magnitude of said 'BT(t)' term for a direct acting controller is as follows:

$$BT(t)=OP(m)-K(PV(t)-SP)-B \text{ with the value of B fixed at 50\%.}$$

and the basic equation for automatically determining the initial magnitude of said 'BT(t)' term for a reverse acting controller is as follows:

$$BT(t)=OP(m)+K(PV(t)-SP)-B \text{ with the value of B fixed at 50\%.}$$

while the bleed rate, being the time taken for the magnitude of said 'BT(t)' term to fall from its initial value to zero, is set externally by the process control engineer, in the same way the set-point 'SP', and the gain 'K' of a controller are set, is preset a default value of 5 minutes.

2. The method of claim 1, but wherein, said 'BT(t)' term is incorporated into said bias 'B', during said preset period of time for transfer from manual to automatic control, as follows: the said bias 'B' itself is moved to match the value required for a bump-less transfer, and then is brought back to the required 50% value, within a fixed preset period of time, and so, said 'BT(t)' term, need not be as a separate entity, but is instead incorporated into the said bias 'B', for said preset period of time required for the said transfer from manual control to automatic control, and so would appear for said preset period of time, as a varying bias, and thus for direct acting controllers, said bias 'B', would, for said preset period of time, be BT(t)+B, and for reverse acting controllers, said bias 'B', would, for said preset period of time, be BT(t)−B.

3. The method of claim 1, wherein, because the said bump-less transfer term, 'BT(t)', does not ensure a totally bump-free transfer of control from manual control to automatic control, a manual method is employed, which manual method calls for the required level, the level in the said vessel should be brought to, deduced from the said manual output, 'OP(m)', said level is manually brought to, through manual facilities, wherever needed, before it is transferred to automatic control to make the transfer utterly bump-less.

* * * * *